UNITED STATES PATENT OFFICE.

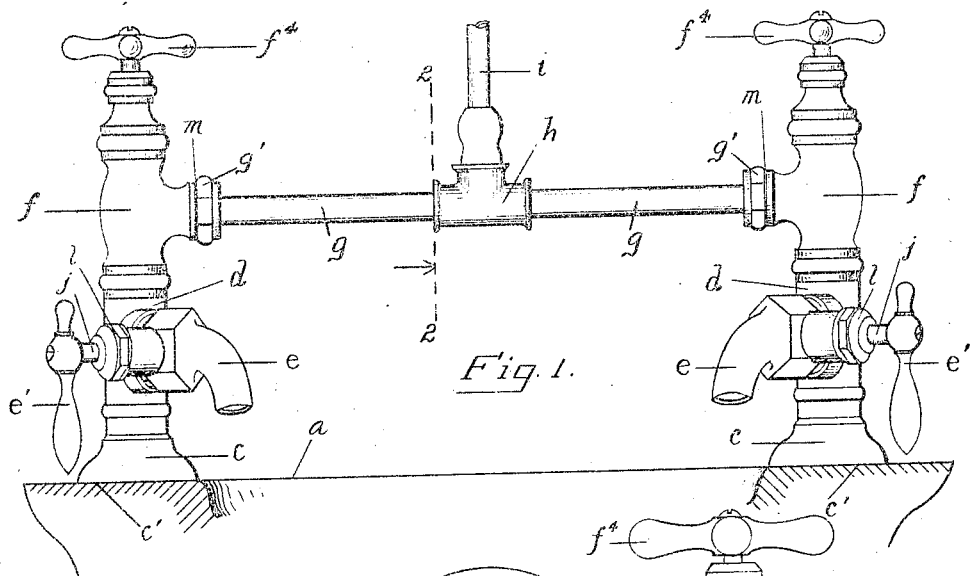
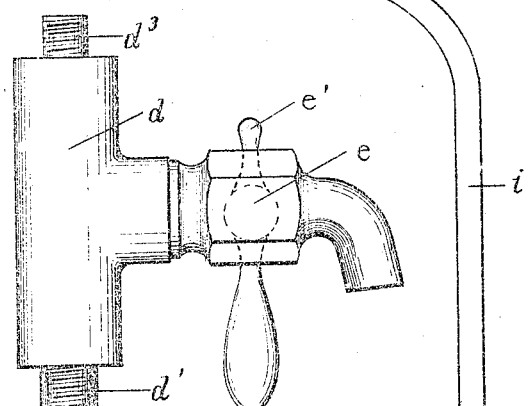
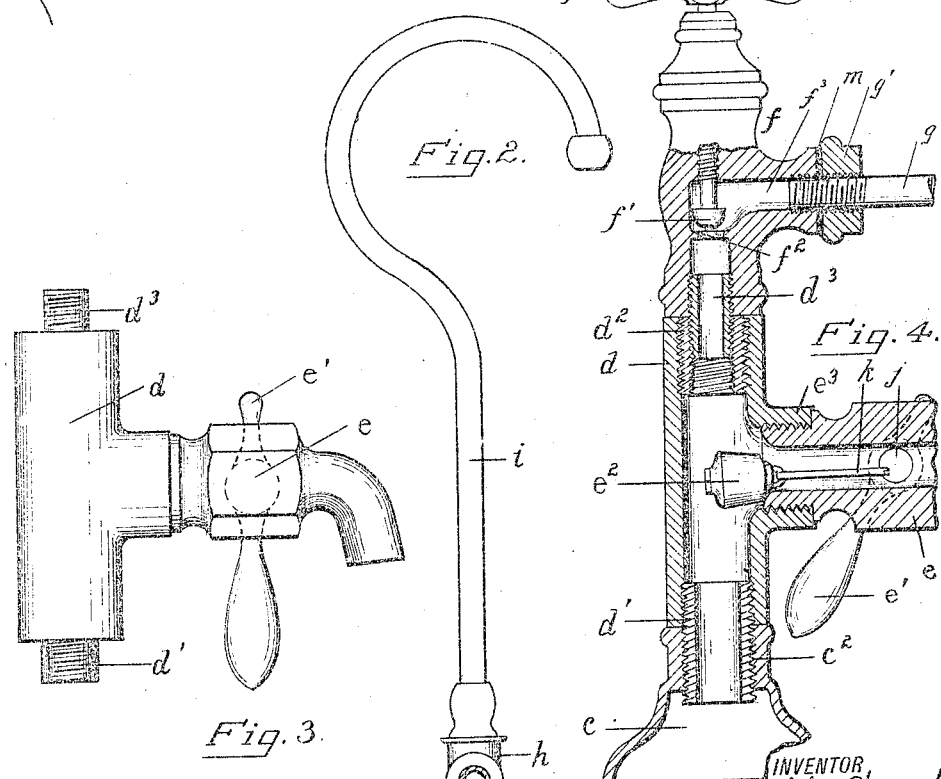
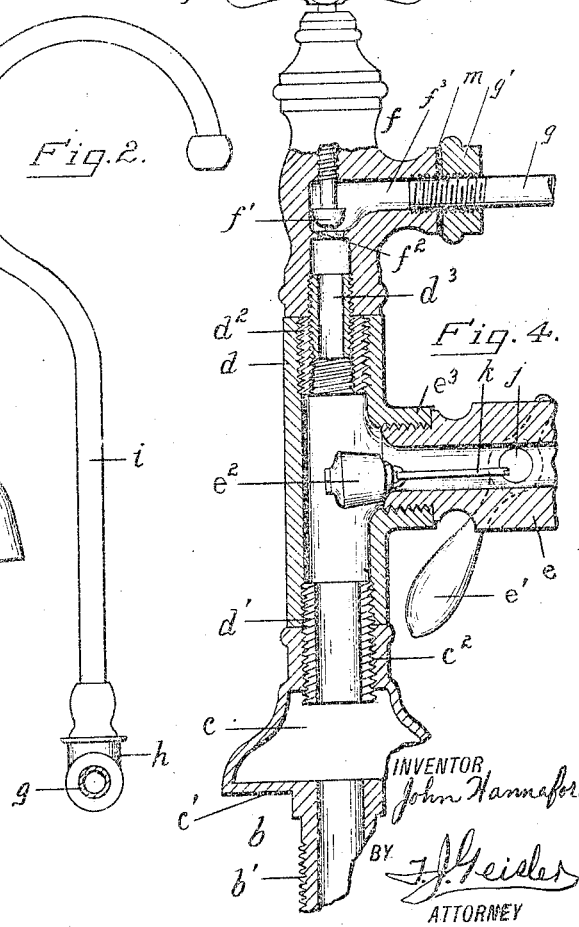

JOHN HANNAFORD, OF PORTLAND, OREGON.

COMBINED FAUCET AND SHAMPOO-FIXTURE.

1,123,189.  Specification of Letters Patent.  Patented Dec. 29, 1914.

Application filed September 28, 1912. Serial No. 722,997.

*To all whom it may concern:*

Be it known that I, JOHN HANNAFORD, a citizen of the United States, and a resident of Portland, county of Multnomah, State of Oregon, have invented a new and useful Improvement in Combined Faucets and Shampoo-Fixtures, of which the following is a specification.

My invention relates to a plumbing fixture called a "shampoo cock," generally used in barbers' shops or in any other place where it is desired to provide for the use of a shampoo "rose" or spray in connection with the regular hot and cold water faucets.

Among the principal objects of my invention are: to obtain an improved fixture for hot and cold water adapted to be used singly and combined for discharging through a common spout located between the two fixtures; to make these fixtures of simple parts easily put together and readily repaired; to avoid undue wear on the valves and the operating devices thereof, and to prevent the annoying hammering in the fixture when turning on or off the water. These and other incidental features I attain in the device hereinafter described and illustrated in the accompanying drawings, in which:

Figure 1 is a front elevation of my device, showing it as installed over a wash-basin provided with hot and cold water faucets; the top part of the basin is represented only, and the service-pipe connections are omitted; Fig. 2 is a vertical section taken on the line 2—2 of Fig. 1, showing the arrangement of the central fixture to which may be attached a tube or a "rose"; Fig. 3 is a side elevation of the T section or primary member of the valve element comprised in my invention; and Fig. 4 is a vertical section of one of such valve elements showing the passage-ways for the water, and the valves controlling the flow of water through such passage-ways.

A portion of a wash-basin of standard construction is represented by $a$, the connections with the hot and cold water service pipes not being shown. A pipe, $b$, connecting with the hot water service pipe, threaded externally, as shown at $b'$ in Fig. 4, is provided with an enlarged head or air chamber $c$. The lower face, $c'$ of the casing, of this air chamber is flat so that it will form a bearing for the fixture upon the wash-basin $a$. The upper end of this air chamber is formed with a neck threaded internally as shown at $c^2$.

A T section $d$ is mounted on the nipple $d'$ with its opposite arms in axial alinement with said nipple $d'$. In the middle opening of said T is threaded a spout $e$. The inner end of said spout is adapted to provide a valve seat for the plug valve $e^2$; the latter is located in the body of the T section $d$, and is eccentrically connected by a link $k$ with the stub shaft $j$. The latter has a handle $e'$ and is held in place by a nut 1, as appears from Fig. 1. In the upper end of the T $d$ is threaded a reducing nipple or bushing $d^2$, and in the latter is threaded a nipple $d^3$. On the latter is mounted the casing $f$ of the second valve $f'$, operated by a handle $f^4$, and seated against a seat $f^2$. The outlet $f^3$ of the valve casing $f$ is threaded for receiving the threaded end of a pipe $g$. On said pipe $g$ is threaded a nut $g'$ which bears against a gasket $m$.

Both of my fixtures are identical in construction and arrangement and corresponding parts are indicated by similar letters. The outer ends of the pipe $g$ are connected to a T $h$, into which is threaded a gooseneck fixture $i$. Said goose-neck may be of any convenient length and shape; it is so arranged as not to interfere with any one using the wash-basin independently of the "rose." The mouth of said goose-neck is adapted for facilitating the easy attachment of a tube or "rose."

The particular advantages derived by the use of the fixture are: The pipes $g$ may be adapted to permit the use of my device on any wash-basin. The goose-neck, $i$, may be adapted in the same way. It may also be arranged to avoid interference with any other fixtures, such as a mirror, which are commonly used above wash-stands in barber shops. The parts used are all of standard make, thus making the device economical to put in and maintain. The wearing parts are all removable and may be replaced by new ones at any time. The nipple $d'$ is arranged to extend below the top of the hollow head $c$, the upper portion of which thus serves as a small air chamber, which prevents any hammering taking place when the valve of one fixture is turned on or off. Since the valves of the two service pipes are generally operated one after the other, this feature is important.

It is to be noticed that the upward pressure of the flow of water, when discharging through the spout $e$, will merely tend to lift the plug valve $e^2$, but not tend to move the latter horizontally against its seat; hence all undue strain on the bearings of the stub valve is eliminated. Furthermore, the described arrangement of said valve $e^2$ renders it easy to open without imposing undue strain on the link $k$.

I claim:

1. In a basin fixture, two vertical tubular valve chambers each having an intermediate lateral outlet, a valve located in each of said chambers, seated against the inner end of the respective outlets and movable horizontally to and from its seat, means for moving said valve; a second valve element controlling the discharge from the upper end of each of said tubular valve chambers; and a spout located between and connecting with the outlets of said second valve elements in the upper end of said tubular valve chambers, the discharge from said intermediate spout being controlled by each of said second mentioned valve elements.

2. In a basin fixture, the combination of an air chamber adapted for being connected with the service pipe, the upper end of said air chamber being formed with an internally threaded neck, a nipple threaded into such neck and extending below the top of the air chamber, a T mounted on said nipple with its opposite arms alined with the axis thereof, a spout mounted on the middle opening of the T and projecting laterally therefrom, the inner end of the spout being adapted to constitute a valve seat, a plug valve located in the body of said T, means for moving said valve horizontally to and from its seat, a nipple threaded into the upper end of the T, and a second valve element mounted on the upper end of the T.

3. In a basin fixture, the combination of an air chamber adapted for being connected with the service pipe, the upper end of said air chamber being formed with an internally threaded neck, a nipple threaded into such neck and extending below the top of the air chamber, a T mounted on said nipple with its opposite arms alined with the axis thereof, a spout mounted on the middle opening of the T and projecting laterally therefrom, the inner end of the spout being adapted to constitute a valve seat, a plug valve located in the body of said T, a stub shaft journaled transversely in the spout and a link connecting the plug valve eccentrically with the stub shaft, a nipple threaded into the upper end of the T, and a second valve element mounted on the upper end of the T.

4. In a basin fixture, the combination of hot and cold water-ways from the service pipes, each water-way comprising an air chamber adapted for being connected with the service pipe, the upper end of each of said air chambers being formed with an internally threaded neck, a nipple threaded into the neck of each of said air chambers and extending below the top of the air chamber, a T mounted on each of said nipples with its opposite arms alined with the axis thereof, a spout mounted on the middle opening of each T and projecting laterally therefrom, the inner end of the spout being adapted to constitute a valve seat, a plug valve located in the body of each of said T's, means for moving each of said valves horizontally to and from its seat, a nipple threaded into the upper end of each of the T's, a second valve element mounted on the upper end of each of the T's, and a spout located between and connecting with the outlets of said second valve elements, the discharge from said spout being controlled by each of said second valve elements.

5. In a basin fixture, the combination of hot and cold water-ways from the service pipes, each water-way comprising an air chamber adapted for being connected with the service pipe, the upper end of each of said air chambers being formed with an internally threaded neck, a nipple threaded into the neck of each of said air chambers and extending below the top of the air chamber, a T mounted on each of said nipples with its opposite arms alined with the axis thereof, a spout mounted on the middle opening of each T and projecting laterally therefrom, the inner end of the spout being adapted to constitute a valve seat, a plug valve located in the body of said T's, a stub shaft journaled transversely in the spout and a link connecting the plug valve eccentrically with the stub shaft, a nipple threaded into the upper end of each of the T's, a second valve element mounted on the upper end of each of the T's, and a spout located between and connecting with the outlets of said second valve elements, the discharge from said spout being controlled by each of said second valve elements.

JOHN HANNAFORD.

Witnesses:
Wm. C. Schmidt,
Cecil Long.